United States Patent
Tanaka et al.

[19]

[11] Patent Number: 6,092,228
[45] Date of Patent: Jul. 18, 2000

[54] MESSAGE RECEIVING APPARATUS AND MESSAGE TRANSMITTING AND RECEIVING METHOD

[75] Inventors: Noriko Tanaka; Hiroshi Uranaka, both of Tokyo; Takashi Hamada, Kanagawa, all of Japan

[73] Assignee: Matsushita Electric Industrial Co., Ltd., Osaka, Japan

[21] Appl. No.: 08/782,165

[22] Filed: Jan. 14, 1997

[51] Int. Cl.[7] .................................................. G06F 11/00
[52] U.S. Cl. ............................... 714/746; 455/7; 455/68; 455/69; 455/70
[58] Field of Search ............................... 371/30; 714/746; 370/95.1, 95.3, 95.2; 379/60, 61, 62, 63; 455/70, 68, 69, 7

[56] References Cited

U.S. PATENT DOCUMENTS

| | | | |
|---|---|---|---|
| 4,876,373 | 10/1989 | Woodworth et al. | 455/12 |
| 5,276,686 | 1/1994 | Ito | 370/95.1 |
| 5,568,635 | 10/1996 | Yamaguchi | 395/497.02 |
| 5,673,252 | 9/1997 | Johnson et al. | 370/95.1 |
| 5,699,493 | 12/1997 | Davidson, Jr. et al. | 395/114 |

*Primary Examiner*—William Grant
*Assistant Examiner*—McDieunel Marc
*Attorney, Agent, or Firm*—Pearne, Gordon, McCoy & Granger LLP

[57] ABSTRACT

A signal 101 from a transmitting station includes: an address 102 specific to a message receiving apparatus; a specific message 103 that is an advance notice indicating receipt of a large-volume message; and a message main body 105. The message receiving apparatus includes: a receiving section 11 that outputs a data string by demodulating the signal 101; a decoder 13 that subjects the data string to an error correcting process, converts the corrected data string into a message, and makes an address collation; an analyzer 14 that analyzes the message and outputs a control signal to a total control section 16 if the analyzed message is a specific message; a buffer 15 that stores a message main body; and the total control section 16 that stops a peripheral device section 17 in accordance with signals obtained from the decoder and the analyzer and controls display by sending a message in the buffer 15 to the peripheral device section 17.

8 Claims, 11 Drawing Sheets

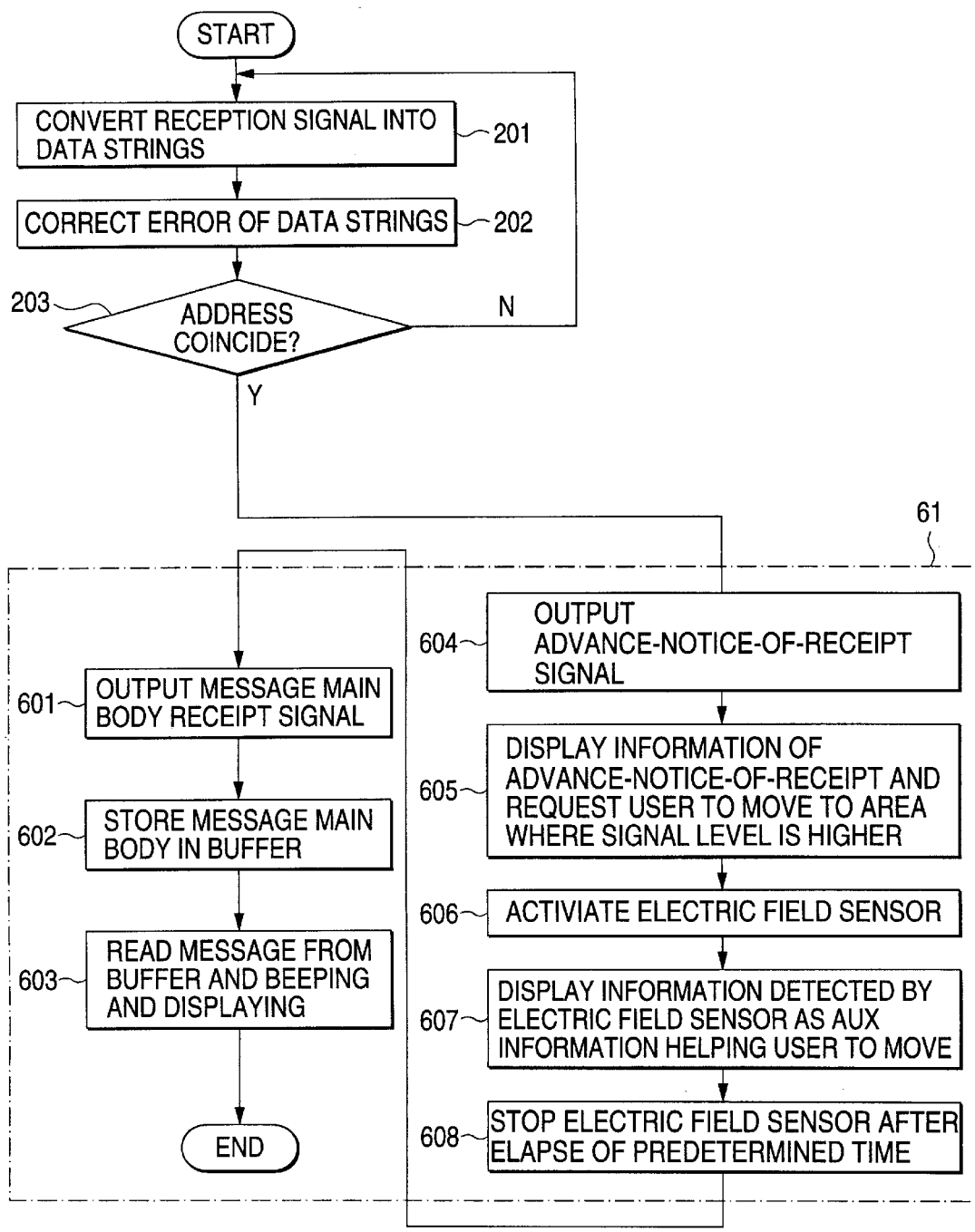

MESSAGE RECEIVING APPARATUS AND MESSAGE TRANSMITTING AND RECEIVING METHOD

BACKGROUND OF THE INVENTION

The invention relates to a message receiving apparatus that is individually called on a selective basis and a message transmitting and receiving method.

Conventional message receiving apparatuses such as pagers have expanded their calling methods from conventional beeping to message transmission achieved by receiving not only numerals and characters but also graphics data. Such functional expansion sustains a trend toward increased volume of received data.

A conventional message receiving apparatus will be described hereinafter. FIG. 8 shows a construction of a conventional message receiving apparatus. In FIG. 8, reference numeral 81 denotes a receiving section that receives a signal from a transmitting station and outputs a data string by demodulating the signal; and 82, a data processing section that analyzes the data string outputted from the receiving section 81, performs the data string to an error correcting process, makes an address collation, converts the thus processed data string to a message, etc. The data processing section 82 is formed of a decoder 83 that subjects a data string to an error correcting process and makes an address collation and of a buffer 84 that stores a message converted by the decoder 83. Reference numeral 85 denotes a peripheral device section that beeps and displays messages; 86, a total control section that controls reading of messages within the buffer 84, displaying the messages by sending the read messages to the peripheral device section 85, etc.

Then, an operation of the thus constructed message receiving apparatus will be described. First, a signal from a transmitting station is received by the receiving section 81. This signal is, for example, a POCSAG signal currently used for pagers. The receiving section 81 demodulates this signal and converts the demodulated signal into a data string. The decoder 83 receives the data string from the receiving section 81 and subjects the data string to an error correcting process. Generally, a BCH code is used for error correction. If the data is found to be an address, such address is collated with an address specific to the message receiving apparatus. If these addresses are coincident with each other, a message arrival signal is outputted to the total control section 86. The decoder 83 decodes the message by subjecting an inputted data string to an error correcting process and writes the message to the buffer 84. In response to the message arrival signal from the decoder 83, the total control section 86 either displays a message by reading the message stored in the buffer 84 and sending the message to the peripheral device section 85 or beeps by sending a signal indicating the arrival of a message.

However, the aforementioned conventional message receiving apparatus encounters not only circuitry design restrictions for meeting downsizing and low dissipation requirements but also needs for receiving feeble signals as the user moves. Therefore, the operation of the receiving apparatus itself adversely affects the receiving section, thus imposing the problem that bit errors are committed. In particular, as the length of a message is increased, it is highly likely that messages contain errors, and this has imposed the further problem to be solved for accommodating needs for receiving large-volume messages.

SUMMARY OF THE INVENTION

The invention has been made to overcome these problems encountered by the conventional art. The object of the invention is therefore to provide a message receiving apparatus and a message transmitting and receiving method that can reduce bit errors in receiving large-volume messages.

To achieve the above object, the invention is characterized in that an analyzer, which outputs a control signal to a total control section when a specific message that is an advance notice of receipt of a large-volume message has been received, is arranged in the data processing section in the conventional construction, and that the total control section controls the operation of a peripheral device section based on the control signal. Further, as part of the peripheral device section, a display that displays a message, an electric field strength, and the like outputted from an electric field strength sensor and the total control section, the electric field strength sensor measuring electric field strength at the time of receiving a signal from a transmitting station.

As a result of the aforementioned construction, the invention can reduce errors in receiving a large-volume message by sending a specific message that gives an advance notice of transmission of a large-volume message when the large-volume message is transmitted from a transmitting station. In other words, by receiving a specific message that gives an advance notice of transmission of a large-volume message before receiving a message main body, the operation of a peripheral device that becomes the source of noise is stopped so that negative effects on the receiving section can be minimized. Further, by either displaying on a display that a large-volume message will be received or by beeping, the user is requested to move to an area where the signal level is higher. An electric field strength sensor is arranged as an auxiliary data source, and electric field strength data is displayed on the display. As a result, the user can move to an area where the signal level is higher, which in turn allows the user to receive a large-volume message in the area having larger electric field strength, at where higher level signal can be received. As a result of the foregoing construction and operation, bit errors in receiving large-volume messages can be reduced.

BRIEF DESCRIPTION OF THE DRAWINGS

FIGS. 6A and 6B are flow charts showing an operation of the message receiving apparatus in the third embodiment, and a modification thereof;

DETAILED DESCRIPTION OF PREFERRED EMBODIMENTS

First Embodiment

Figure 1A:
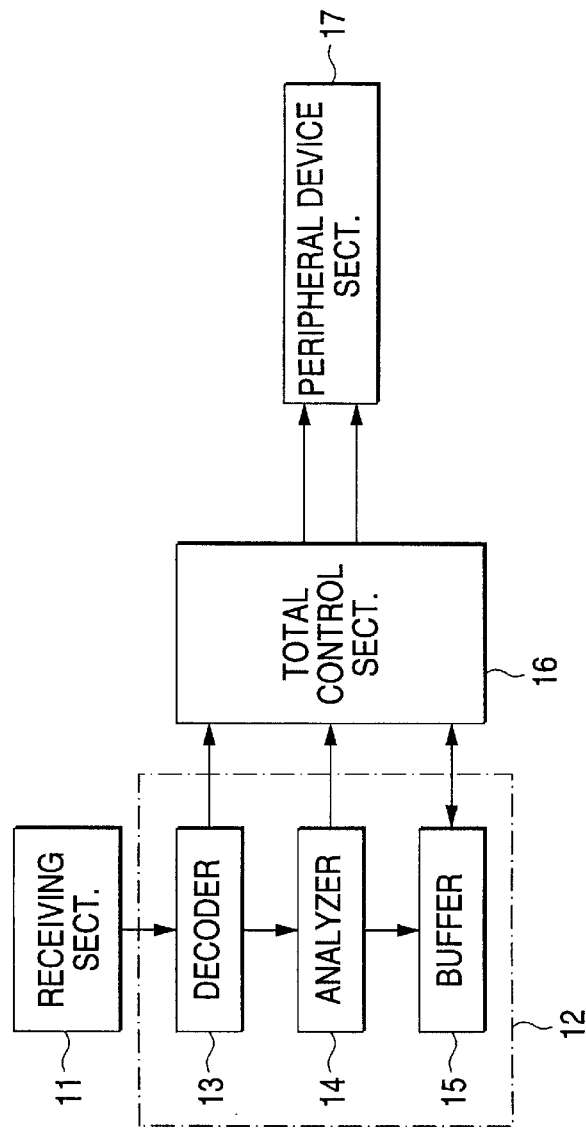
FIG. 1A is a block diagram showing a construction of a message receiving apparatus according to a first embodiment of the invention.

A first embodiment of the invention will now be described with reference to the drawings. FIG. 1A shows a construction of a message receiving apparatus that reduces bit errors in receiving large-volume messages. In FIG. 1A, reference numeral 11 denotes a receiving section that receives a signal from a transmitting station and outputs a data string by demodulating the signal; and 12, a data processing section. In the data processing section 12, reference numeral 13 denotes a decoder that subjects a data string obtained from the receiving section 11 to an error correcting process, converts the error-corrected data string into a message, and makes an address collation, etc for the converted message. Reference numeral 14 denotes an analyzer that analyzes a message obtained from the decoder 13 and outputs a control signal to a total control section 16 if the analyzed message is a specific message that is an advance notice indicating a large-volume message will be received; 15, a buffer that stores a message main body; 16, the total control section that accesses the buffer 15 and controls a peripheral device section 17 in accordance with control signals from the decoder 13 and the analyzer 14; and 17, the peripheral device section that displays and beeps.

With respect to the thus constructed message receiving apparatus according to this embodiment, an operation thereof will be described with reference to the format of a signal indicating a large-volume message shown in FIG. 1B and a processing flowchart shown in FIG. 2A.

Figure 1B:
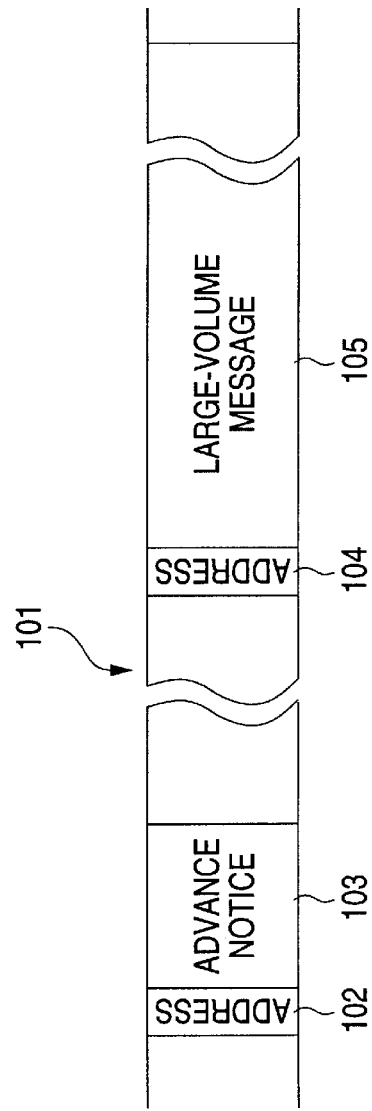
FIG. 1B is a diagram showing a format of a large-volume message signal in an embodiment of the invention.

The format of a large-volume message signal 101 shown in FIG. 1B is as follows. Reference numeral 102 denotes an address specific to the message receiving apparatus. It is immediately after this address 102 has been transmitted that a specific message 103 is transmitted. This specific message 103 is designed to given an advance notice that a large-volume message will be transmitted. After the elapse of a predetermined time, an address 104 specific to the message receiving apparatus is transmitted again, and the message main body 105 carrying a large-volume message will be transmitted immediately thereafter.

First, the receiving section 11 receives a signal from the transmitting station and converts the signal into a data string by demodulating the signal (Step 201). The decoder 13 that has obtained the data string from the receiving section 11 subjects the data string to an error correcting process, etc. (Step 202). If the data is an address, the decoder 13 makes an address collation (Step 203), and if the address 102 in the converted message coincides with the address specific to the message receiving apparatus, the decoder 13 outputs a message arrival signal to the total control section 16 (Step 204). Data strings received during these operations are similarly subjected to error correcting processes and are sequentially converted into messages and outputted to the analyzer 14. The analyzer 14 judges whether or not a next message is a specific message 103 (Step 205), and if the next message has been found out to be the specific message 103, a specific message receipt signal is outputted to the total control section 16 (Step 210). The total control section 16 stops the operation of the peripheral device section 17 in accordance with such information (Step 211). During these operations, the receiving section 11 and the decoder 13 continue their operations up to making an address collation. The decoder 13 thereafter detects the address 104 again (Step 203) and outputs a message arrival signal to the total control section 16 (Step 204). If a next message has been found out to be a message main body 105 (Step 205), the analyzer 14 stores the message main body 105 in the buffer 15 until the message main body 105 has been completely received (Step 206). Upon completion of receipt of the message main body, the analyzer 14 outputs a message main body receipt completion signal to the total control section 16 (Step 207), and the total control section 16 activates the peripheral device section 17 in accordance with this information (Step 208), reads the message from the buffer 15, and effects control by beeping, displaying, etc. (Step 209). As a result of these operations, noise produced by the peripheral device section 17 against received signals can be minimized, which in turn contributes to reducing bit errors in receiving large-volume messages.

Figure 7A:
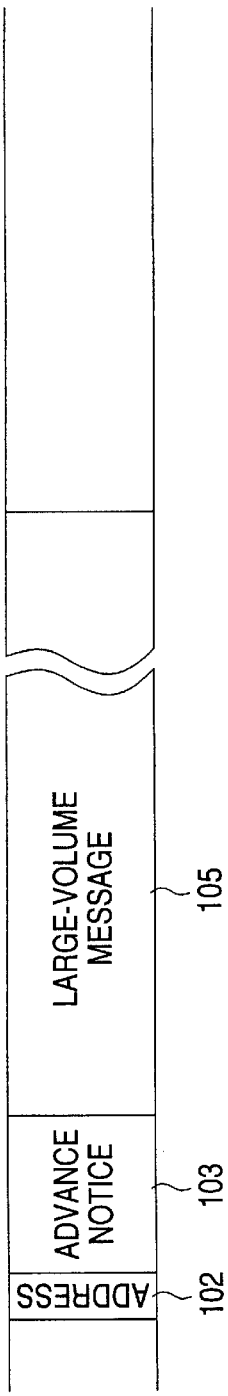
FIGS. 7A to 7C are other diagrams showing formats of large-volume message signals in embodiments of the invention.
Figure 7B:
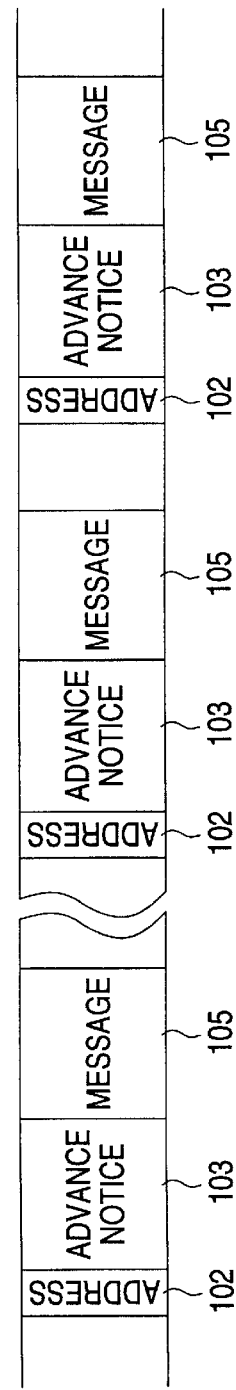

In this embodiment, a signal to be transmitted is formatted in such a manner that the specific message 103 is transmitted immediately after the address 102, that the address 104 is thereafter transmitted again, and that the message main body 105 of a large-volume message is transmitted immediately thereafter a shown in FIG. 1B. As shown in FIG. 7A, even if the large-volume message 105 is transmitted immediately after the specific message 103, it can be inferred with ease that similar effect can be obtained as long as peripheral devices are stopped immediately after the specific message 103 has been received. FIG. 7B shows a case where a plurality of bodies of large-volume messages are transmitted under the signal format shown in FIG. 7A. In this case, each specific message 103 carries information as to whether the current transmission of a large-volume message ends or not. It can be inferred with ease that similar effect can also be obtained by the message receiving apparatus while stopping the operation of the peripheral devices and continuing receipt of large-volume messages until a specific message 103 informs the message receiving apparatus of the end of a transmission of a large-volume message. Further, in this case, added to the first specific message 103 is the number of transmitting large-volume messages following the first specific message 103. Similar effect can be obtained also by stopping the operation of the peripheral devices until a number of large-volume messages equal to the number of large-volume messages added are received.

Figure 7C:
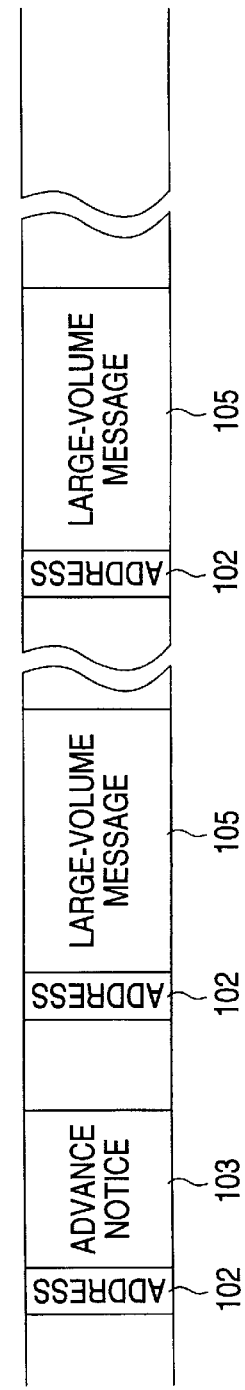
Figure 8:
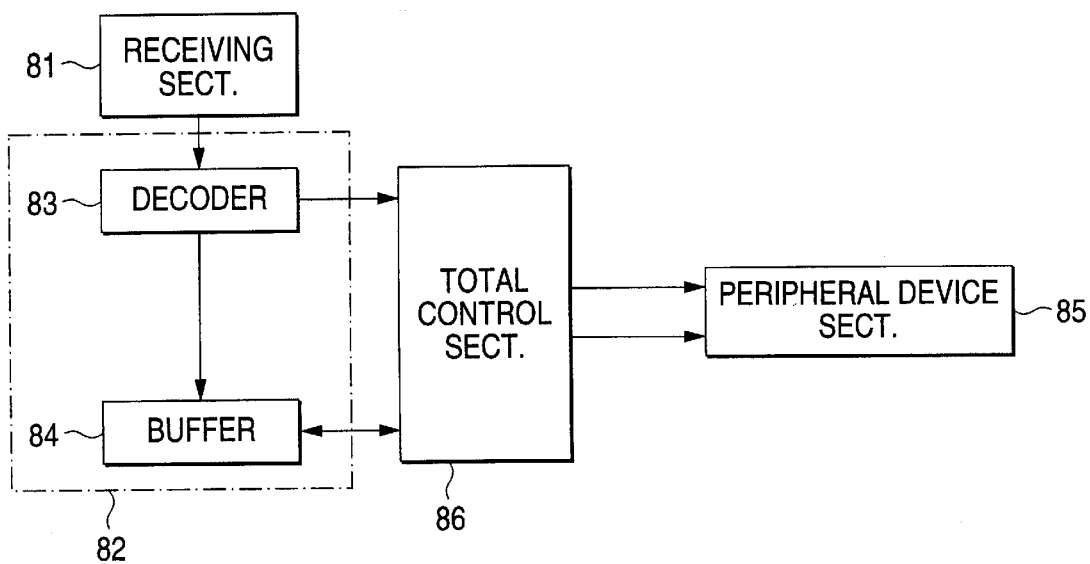
FIG. 8 is a block diagram showing a construction of a conventional message receiving apparatus.

Further, while the specific message 103 is received before the message main body 105 is received in this embodiment, this specific message is considered to serve as a command for controlling the peripheral devices. It can also be inferred with ease that this command is expanded to be applied to the control of components other than the peripheral devices. For example, simultaneous massaging can be implemented by preparing a command for controlling the receiving section 11 so that a message can be received after a predetermined time irrespective of the presence of an address. Further, as shown in FIG. 7C, a command for controlling the total control section 16 so that in the case where a large-volume message is transmitted in segments, a plurality of message segments to be received thereafter are grouped together into the single original large-volume message, so that larger-volume messages can be transmitted.

Further, while it is so controlled that the operation of the peripheral devices is stopped only when a transmitting message is a large-volume message in the embodiment, this control of the invention may be effected for all received messages. In this case, it is not necessary to use a specific message as a control command; an advance-notice-of-receipt signal may be outputted when the addresses are coincident with each other as shown in a flow of FIG. 2B.

Second Embodiment

Figure 3:
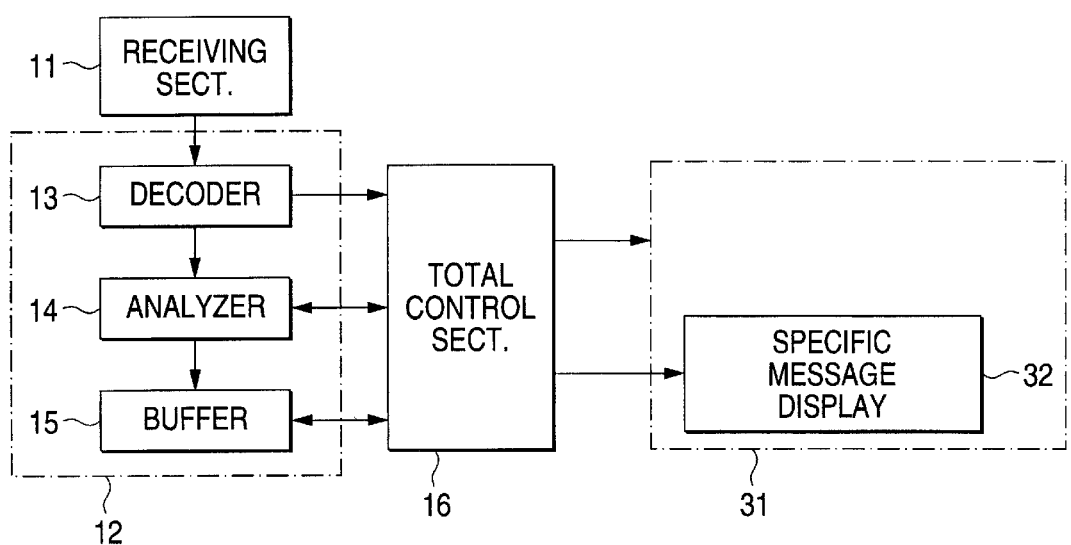
FIG. 3 is a block diagram showing a construction of a message receiving apparatus in a second embodiment of the invention.

Then, a second embodiment of the invention will be described with reference to the drawings. FIG. 3 is a construction diagram of a message receiving apparatus that reduces bit errors in receiving large-volume messages in the second embodiment of the invention. In FIG. 3, the same parts and components as those of FIG. 1 are denoted as the same reference numerals and the description thereof will be omitted. Reference numeral 31 denotes a peripheral device section and includes a specific message display 32 that displays specific message receipt information to thereby request the user to move to an area where the signal level is higher.

With respect to the thus constructed message receiving apparatus according to this embodiment, an operation thereof will be described with reference to the format of a signal at the time of receiving a large-volume message shown in FIG. 1B and a processing flowchart shown in FIG. 4A.

Figure 2A:
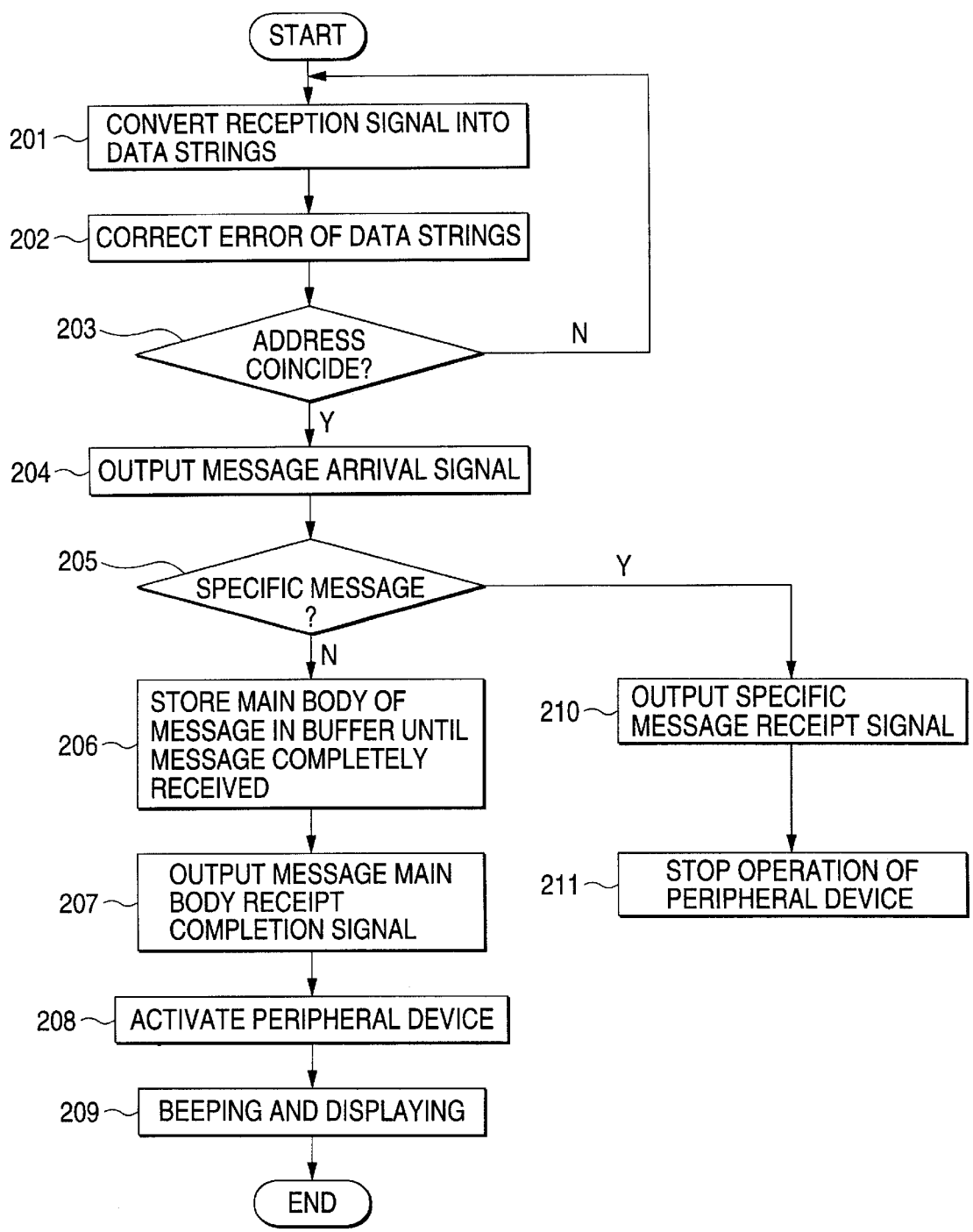
FIGS. 2A and 2B are flow charts showing an operation of the message receiving apparatus in the first embodiment, and a modification thereof.
Figure 2B:
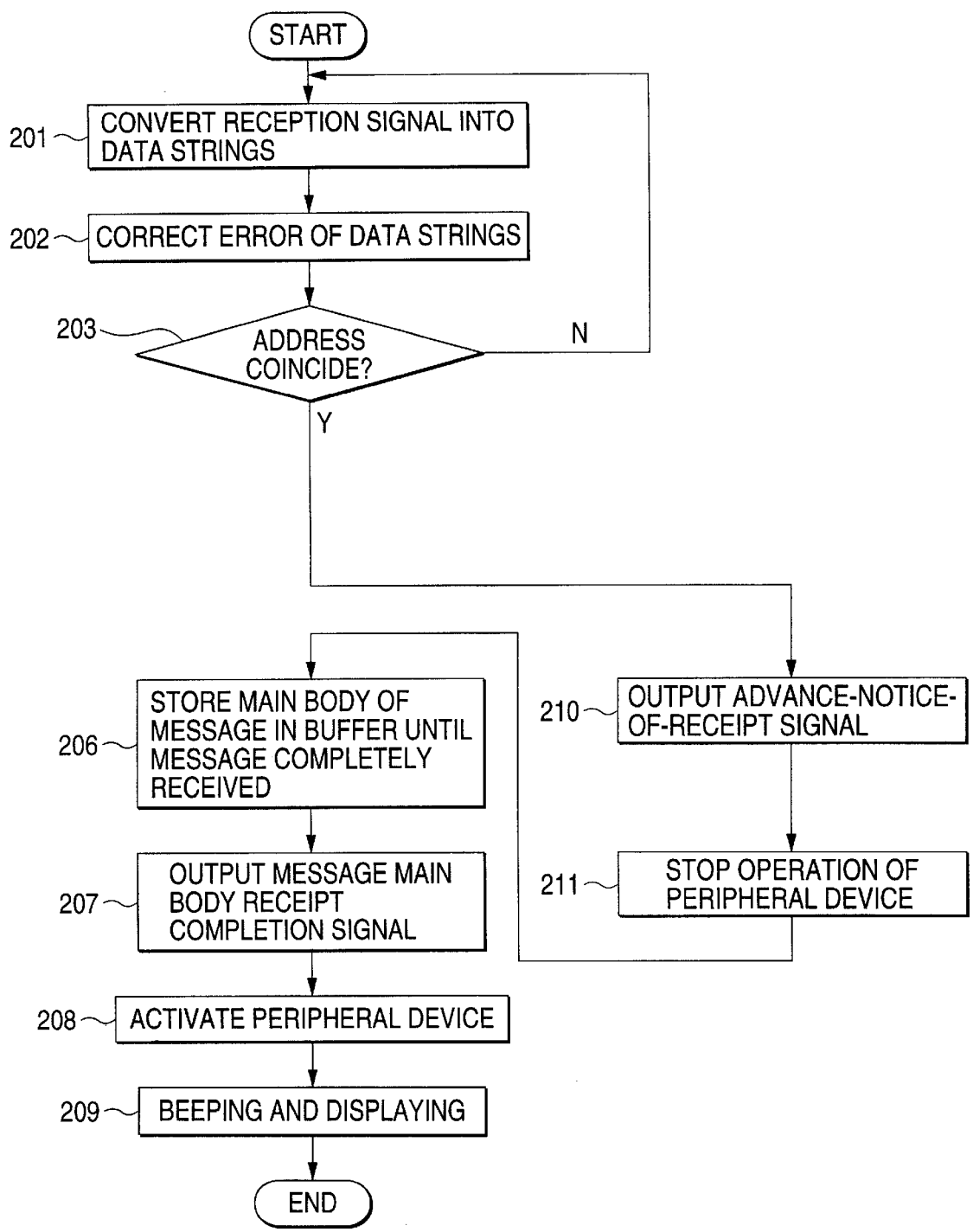
Figure 4A:
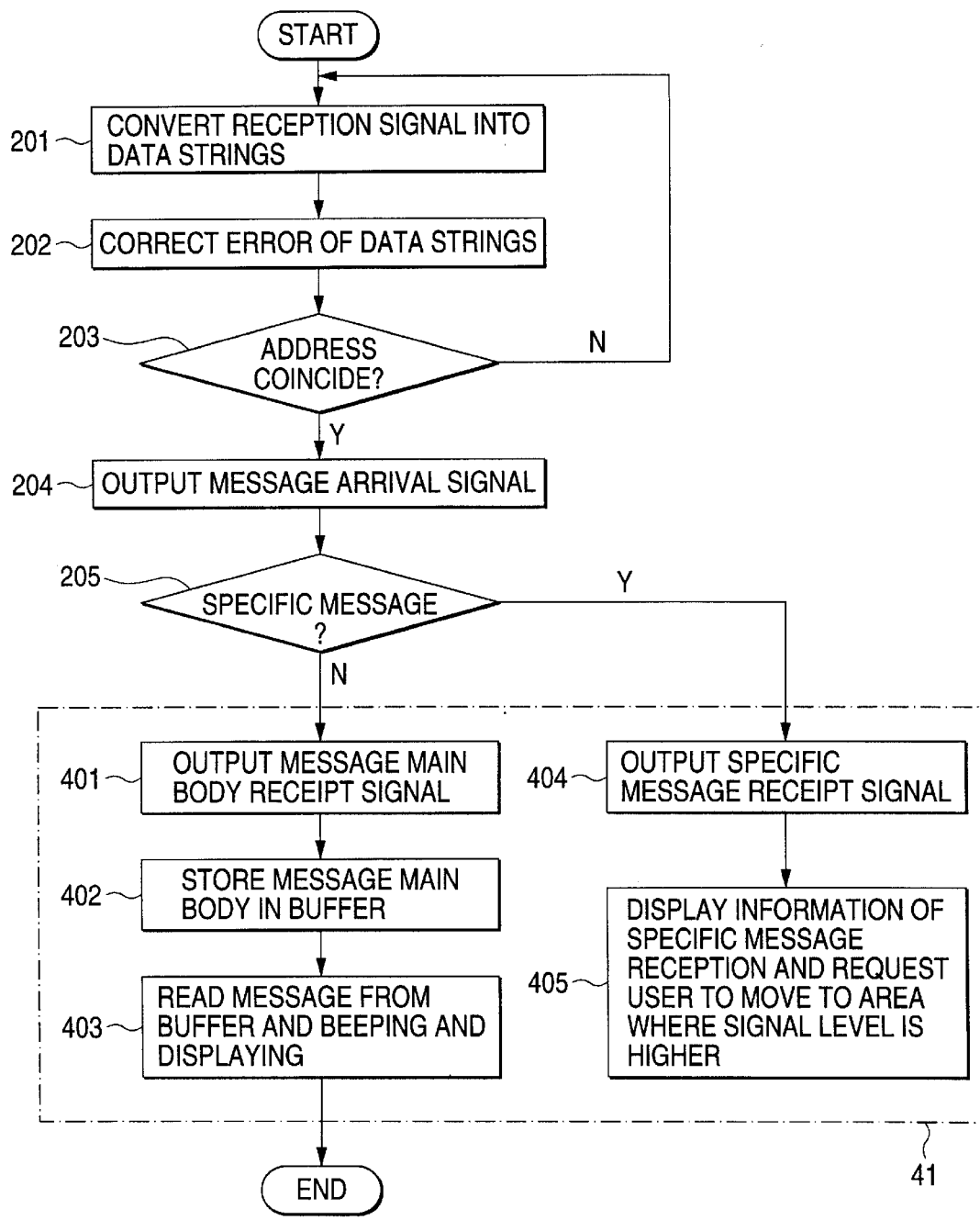
FIGS. 4A and 4B are flow charts showing an operation of the message receiving apparatus in the second embodiment, and a modification thereof.

In FIG. 4A, the same portions as those of FIG. 2A are denoted as the same reference numerals and the descriptions thereof will be omitted. Reference numeral 41 denotes a difference in the processing in first embodiment. The same operations are performed as those in the first embodiment up to receipt of a specific message 103. The analyzer 14 judges whether or not a next message is a specific message 103 (Step 205). If the next message has been found out to be the specific message 103, a specific message receipt signal is outputted to the total control section 16 (Step 404). In accordance with this control signal, the total control section 16 not only gives an advance notice of receipt by beeping, etc. but also displays on the specific message display 32 information indicating that a large-volume message will be transmitted, so that the user is requested to move to an area where signal level is higher (Step 405). During these operations, the receiving section 11 and the decoder 13 continue their operations up to making an address collation. Then, the decoder 13 detects an address 104 again (Step 203), and outputs a message arrival signal to the total control section 16 (Step 204). If a next message is a message main body 105 (Step 205), the analyzer 14 outputs a message main body receipt signal to the total control section 16 (Step 401) and sequentially stores the message main body in the buffer 15 (Step 402). In accordance with the control signal, the total control section 16 sequentially reads the messages from the buffer 15 and effects control by beeping, displaying, etc. to the peripheral device section 31 (Step 403). Thus, by causing the user to move to an area where signal level is higher, bit errors in receiving large-volume messages can be reduced.

Figure 4B:
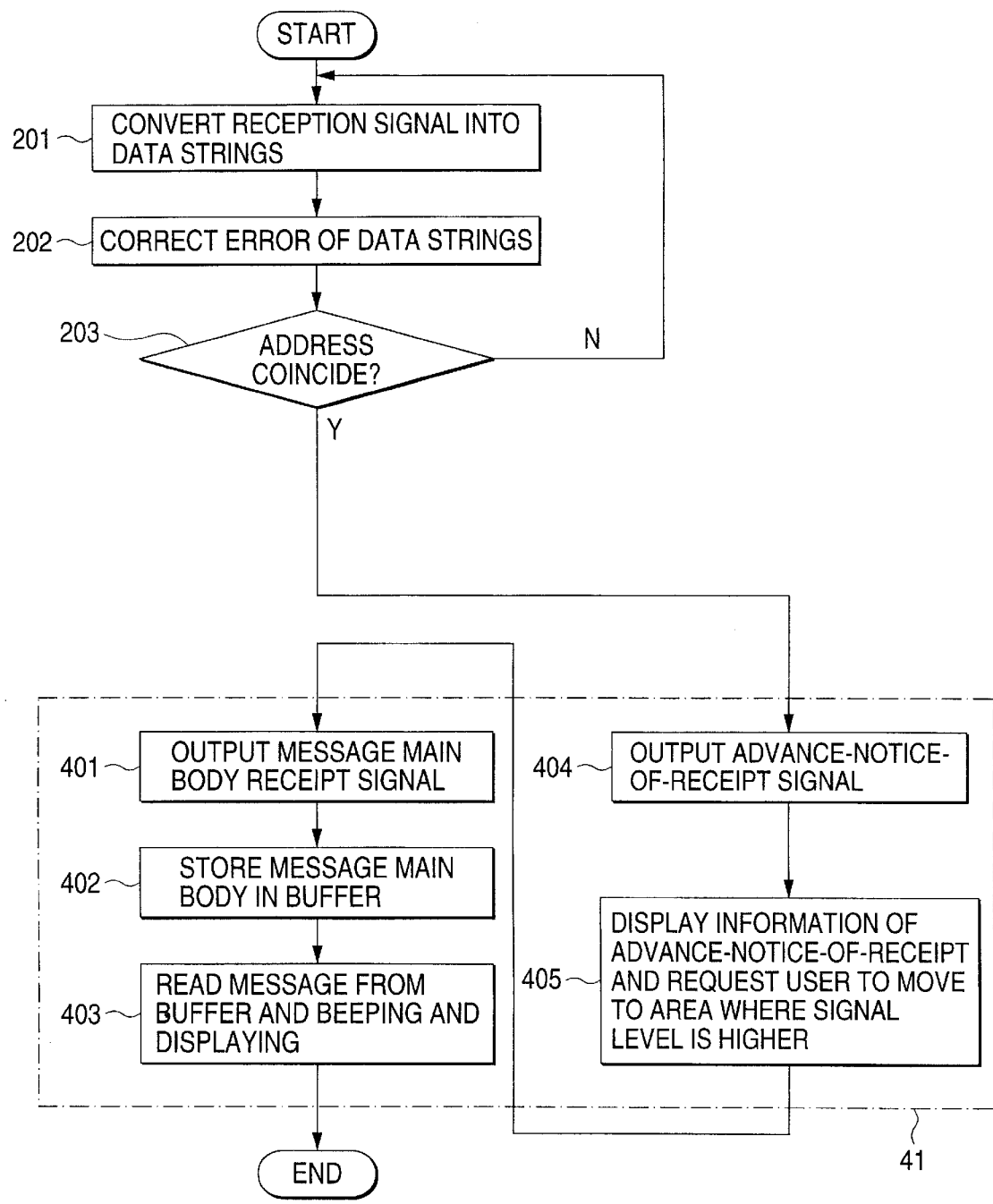

Further, in this embodiment also, the control of the invention may be effected for all received messages. In this case, it is not necessary to use a specific message as a control command; an advance-notice-of-receipt signal may be outputted when the addresses are coincident with each other as shown in a flow of FIG. 4B.

Third Embodiment

Figure 5:
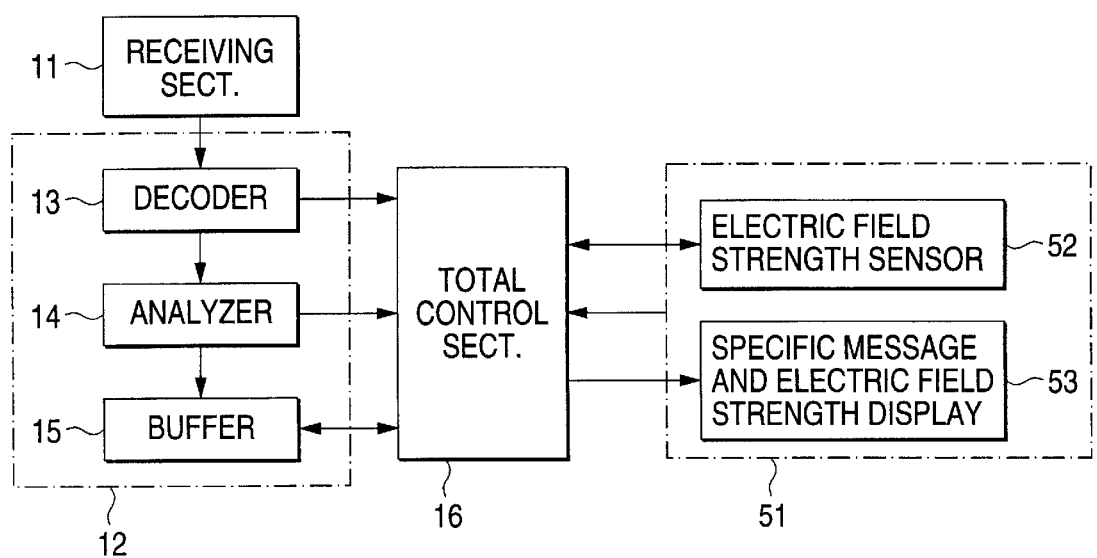
FIG. 5 is a block diagram showing a construction of a message receiving apparatus in a third embodiment of the invention.

Then, a third embodiment of the invention will be described with reference to the drawings. FIG. 5 shows a construction of a message receiving apparatus that reduces bit errors in receiving large-volume messages in the third embodiment of the invention. In FIG. 5, the same parts and components as those of FIG. 1 are denoted as the same reference numerals and the descriptions thereof will be omitted. Reference numeral 51 denotes a peripheral device section, and includes: an electric field strength sensor 52 that detects electric field strength at the time a signal has received; and a specific message and electric field strength display 53 that displays specific message receipt information to thereby request the user to move to an area where signal level is higher, or displays electric field strength information.

With respect to the thus constructed message receiving apparatus according to this embodiment, an operation thereof will be described with reference to the format of a signal at the time of receiving a large-volume message shown in FIG. 1B and a processing flowchart shown in FIG. 6A.

Figure 6A:
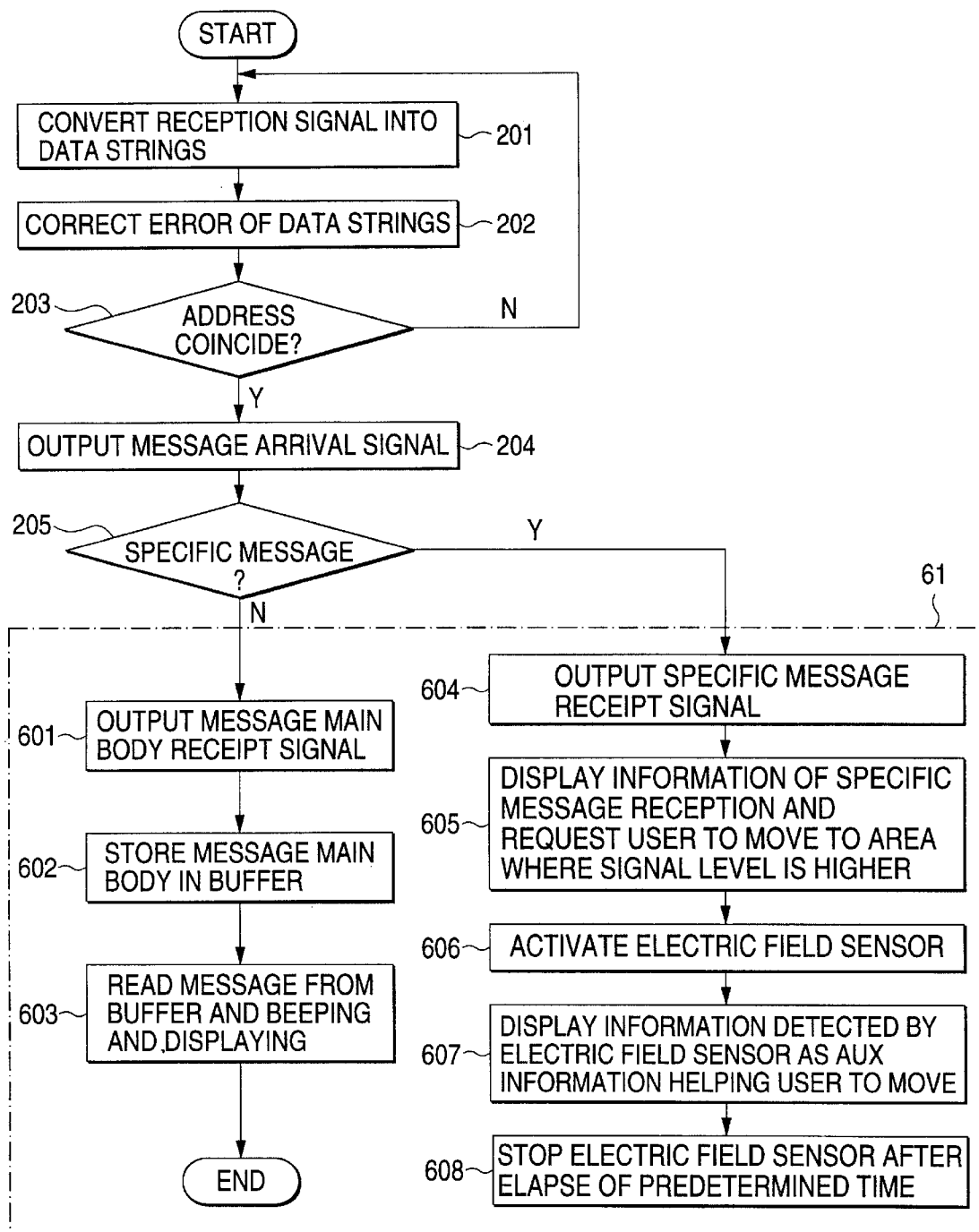

In FIG. 6A, the same portions as those of FIG. 2A are denoted as the same reference numerals and the descriptions thereof will be omitted. Reference numeral 61 denotes a difference in the processing in the first embodiment. The same operations as those in the first embodiment are performed up to receipt of a specific message 103. The analyzer 14 judges whether or not a next message is a specific message 103 (Step 205). If the next message has been found out to be the specific message 103, a specific message receipt signal is outputted to the total control section 16 (Step 604). In accordance with this control signal, the total control section 16 not only gives an advance notice of receipt by beeping, etc. but also displays on the specific message and electric field strength display 53 information indicating that a large-volume message will be transmitted, so that the user is requested to move to an area where signal level is higher (Step 605). At the same time, the total control section 16 activates the electric field strength sensor 52 (Step 606). The electric field strength sensor 52 outputs the detected electric field strength information to the total control section 16, and the total control section 16 displays the information on the specific message and electric field strength display 53 as auxiliary information helping the user to move (Step 607). After the elapse of a predetermined time, the total control section 16 stops the electric field strength sensor 52 (Step 608). During these operations, the receiving section 11 and the decoder 13 continue their operations up to making an address collation. Then, the decoder 13 detects an address 104 again (Step 203), and outputs a message arrival signal to the total control section 16 (Step 204). If a next message is a message main body 105 (Step 205), the analyzer 14 outputs a message main body receipt signal to the total control section 16 (Step 601), and sequentially stores the message main body in the buffer 15 (Step 602). In accordance with this control signal, the total control section 16 sequentially reads the messages from the buffer 15 and effects control by beeping, displaying, etc. to the peripheral device section 51 (Step 603). Thus, the display of electric field strength information helps and expedites the user to move to an area where signal level is larger in order to reduce bit errors with in receiving large-volume messages.

Further, in this embodiment also, the control of the invention may be effected for all received messages. In this case, it is not necessary to use a specific message as a control command; an advance-notice-of-receipt signal may be outputted when the addresses are coincident with each other as shown in a flow of FIG. 6B.

As described in the foregoing, the invention is characterized as including: a receiving section that receives a signal from a transmitting station and outputting a data string by demodulating the signal; a decoder that subjects the data string to an error correcting process, converts the corrected data string into addresses and messages, and makes an address collation; an analyzer that analyzes a message and outputs a control signal to a total control section if the analyzed message is a specific message; a buffer that stores a message main body; and the total control section that not only accesses the buffer but also controls a peripheral device section in accordance with signals received from the decoder and the analyzer. Therefore, noise to the received signals produced by the operation of peripheral devices can be minimized by receiving the specific message before receiving the message main body. Further, the peripheral device section that displays, beeps, etc. includes: a display that displays advance-notice information indicating receipt of a large-volume message and electric field strength information to be outputted from the total control section; and an electric field strength sensor that detects an electric field strength at the time of receiving a signal from the transmitting station. Therefore, the user can be requested to move to an area where signal level is higher, which in turn contributes to allowing the user to receive large-volume messages in the area where signal level is higher and therefore to providing the advantage of reducing bit errors in receiving large-volume messages.

What is claimed is:

1. A message receiving apparatus comprising:
   a receiving section for receiving a signal from a transmitting station and outputting a data string by demodulating the signal;
   a decoder for subjecting the data string to an error correcting process, converting the corrected data string into an address and a message, and collating the received address with an address specific to the apparatus;
   an analyzer for analyzing an output from the decoder and outputting a specific message receipt signal containing advance notice indicating a large-volume message will be received;
   a buffer for storing a message main body;
   a peripheral device section to which the message is sent; and
   a control section for accessing the buffer, controlling the peripheral device section in accordance with information obtained from the decoder and the analyzer, and stopping the operation of the peripheral device section upon receipt of the specific message receipt signal to reduce noise generated by the peripheral device.

2. A message receiving apparatus according to claim 1, wherein the specific message receipt signal is outputted only when a received message is a large-volume message.

3. A message receiving apparatus as recited in claim 1, wherein the signal from the transmitting station has a format including: an address specific to the message receiving apparatus; a message receiving apparatus controlling command to be transmitted before a message main body; and the message main body.

4. A message receiving apparatus comprising:
   a receiving section for receiving a signal from a transmitting station and outputting a data string by demodulating the signal;
   a decoder for subjecting the data string to an error correcting process, converting the corrected data string into an address and a message, and collating the received address with an address specific to the apparatus;
   an analyzer for analyzing an output from the decoder and outputting a specific message receipt signal containing advance notice indicating a large-volume message will be received;
   a buffer for storing a message main body;
   a peripheral device section to which the message is sent, the peripheral device section having a display for displaying a received message; and
   a control section for accessing the buffer, controlling the peripheral device section in accordance with information obtained from the decoder and the analyzer, and displaying a request to a user on the display upon receipt of the specific message receipt signal.

5. A message receiving apparatus according to claim 4, wherein the request to the user displayed on the display is to move to an area where a signal level is larger.

6. A message receiving apparatus as recited in claim 4, wherein the signal from the transmitting station has a format including: an address specific to the message receiving apparatus; a message receiving apparatus controlling command to be transmitted before a message main body; and the message main body.

7. A message receiving apparatus comprising:
   a receiving section for receiving a signal from a transmitting station and outputting a data string by demodulating the signal;
   a decoder for subjecting the data string to an error correcting process, converting the corrected data string into an address and a message, and collating the received address with an address specific to the apparatus;
   an analyzer for analyzing an output from the decoder and outputting a specific message receipt signal containing advance notice indicating a large-volume message will be received;
   a buffer for storing a message main body;
   a peripheral device section to which the message is sent, the peripheral device section having an electric field strength sensor for detecting an electric field strength of a received message signal, and a display for displaying a received message and electric field strength information; and
   a control section for accessing the buffer, controlling the peripheral device section in accordance with information obtained from the decoder and the analyzer, and displaying a request to a user on the display upon receipt of the specific message receipt signal.

8. A message receiving apparatus according to claim 7, wherein the request to the user displayed on the display is to move to an area where a signal level is larger.

* * * * *